United States Patent
Oikawa

(10) Patent No.: US 8,955,550 B2
(45) Date of Patent: Feb. 17, 2015

(54) DAMPER DEVICE

(71) Applicant: Denso Corporation, Kariya, Aichi-pref. (JP)

(72) Inventor: Shinobu Oikawa, Kariya (JP)

(73) Assignee: Denso Corporation, Kariya (JP)

( * ) Notice: Subject to any disclaimer, the term of this patent is extended or adjusted under 35 U.S.C. 154(b) by 35 days.

(21) Appl. No.: 13/860,958

(22) Filed: Apr. 11, 2013

(65) Prior Publication Data

US 2013/0276929 A1    Oct. 24, 2013

(30) Foreign Application Priority Data

Apr. 24, 2012  (JP) .................................. 2012-98520

(51) Int. Cl.
| | |
|---|---|
| *F16L 55/04* | (2006.01) |
| *F16L 55/053* | (2006.01) |
| *F02M 59/06* | (2006.01) |
| *F02M 59/10* | (2006.01) |

(52) U.S. Cl.
CPC .............. *F16L 55/04* (2013.01); *F16L 55/053* (2013.01); *F02M 59/06* (2013.01); *F02M 59/102* (2013.01); *F02M 2200/26* (2013.01); *F02M 2200/315* (2013.01)
USPC .............. 138/30; 138/26; 220/720; 220/721; 417/540

(58) Field of Classification Search
CPC ...... F16L 55/04; F16L 55/0338; F04B 37/12; F04B 53/16; F04B 53/004
USPC ......... 138/26, 30, 31; 220/720–724; 417/540, 417/542
See application file for complete search history.

(56) References Cited

U.S. PATENT DOCUMENTS

| | | | |
|---|---|---|---|
| 6,053,208 A | 4/2000 | Onishi et al. | |
| 6,079,450 A | 6/2000 | Onishi et al. | |
| 8,038,083 B2* | 10/2011 | Junger et al. | 239/585.1 |
| 8,757,212 B2* | 6/2014 | Bartsch et al. | 138/30 |
| 2003/0164161 A1 | 9/2003 | Usui et al. | |
| 2008/0289713 A1* | 11/2008 | Munakata et al. | 138/26 |
| 2010/0209274 A1 | 8/2010 | Oikawa et al. | |
| 2010/0215529 A1 | 8/2010 | Inoue | |
| 2011/0220419 A1* | 9/2011 | Sjodin et al. | 175/99 |

FOREIGN PATENT DOCUMENTS

| | | |
|---|---|---|
| JP | 2004-138071 | 5/2004 |
| JP | 2008-014319 | 1/2008 |
| JP | 2010-007693 | 1/2010 |

OTHER PUBLICATIONS

Office Action (2 pages) dated Mar. 20, 2014, issued in corresponding Japanese Application No. 2012-098520 and English translation (2 pages).

* cited by examiner

*Primary Examiner* — Patrick F Brinson
(74) *Attorney, Agent, or Firm* — Nixon & Vanderhye P.C.

(57) ABSTRACT

A damper device includes a first diaphragm having a first peripheral part, a second diaphragm having a second peripheral part, a first support portion disposed on the opposite side from the second peripheral part with respect to the first peripheral part, and a second support portion disposed on the opposite side from the first peripheral part with respect to the second peripheral part. The first peripheral part and the second peripheral part are supported between the first support portion and the second support portion. Radially outer sections of the first peripheral part, the second peripheral part, the first support portion, and the second support portion are integrally welded with each other.

10 Claims, 5 Drawing Sheets

DAMPER DEVICE

CROSS REFERENCE TO RELATED APPLICATION

This application is based on Japanese Patent Application No. 2012-98520 filed on Apr. 24, 2012, the disclosure of which is incorporated herein by reference in its entirety.

TECHNICAL FIELD

The present disclosure relates to a damper device.

BACKGROUND

Conventionally, a damper device has two diaphragms, and peripheral parts of the two diaphragms are welded with each other. The damper device is arranged in a fuel chamber of a high pressure pump. Pressure pulsation of fuel is reduced by changing the volume of a damper chamber according to the pressure of fuel in the fuel chamber.

JP-2010-7693A describes a damper device having a resin component which covers the peripheral parts of the two diaphragms. When the damper device is mounted to a high pressure pump, the damper device is fixed between a base of the housing and a retainer at plural positions in the circumference direction.

In JP-2010-7693A, the resin component which covers the peripheral parts of the diaphragms is made of resin, and not all the circumference of the peripheral parts of the diaphragms are covered with the base and the retainer. Each of the diaphragms is deformed when the volume of the damper chamber becomes large according to the pressure of fuel. At this time, the peripheral parts of the diaphragms may be deformed to be separated from each other. In this case, the stress caused by the deformation may act on the weld part.

Moreover, when the damper device is manufactured, it is necessary to mold the resin component around the peripheral parts after welding, so the number of manufacture processes is increased.

SUMMARY

According to an example of the present disclosure, a damper device disposed in a fluid passage of a high-pressure pump includes a first diaphragm, a second diaphragm, a first support portion, and a second support portion. The first diaphragm has a first damper part which is elastically deformable, and a first peripheral part having an annular shape around the first damper part. The second diaphragm has a second damper part and a second peripheral part having an annular shape overlapping with the first peripheral part. A damper chamber is defined between the first damper part and the second damper part. The second damper part is elastically deformable together with the first damper part to increase or decrease a volume of the damper chamber according to a pressure of fluid in the fluid passage. The first support portion made of metal has an annular shape, and is disposed on the opposite side from the second peripheral part with respect to the first peripheral part. The second support portion made of metal has an annular shape, and is disposed on the opposite side from the first peripheral part with respect to the second peripheral part. The first peripheral part and the second peripheral part are supported between the first support portion and the second support portion. Radially outer portions of the first peripheral part, the second peripheral part, the first support portion, and the second support portion are integrally welded with each other to have a common weld part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
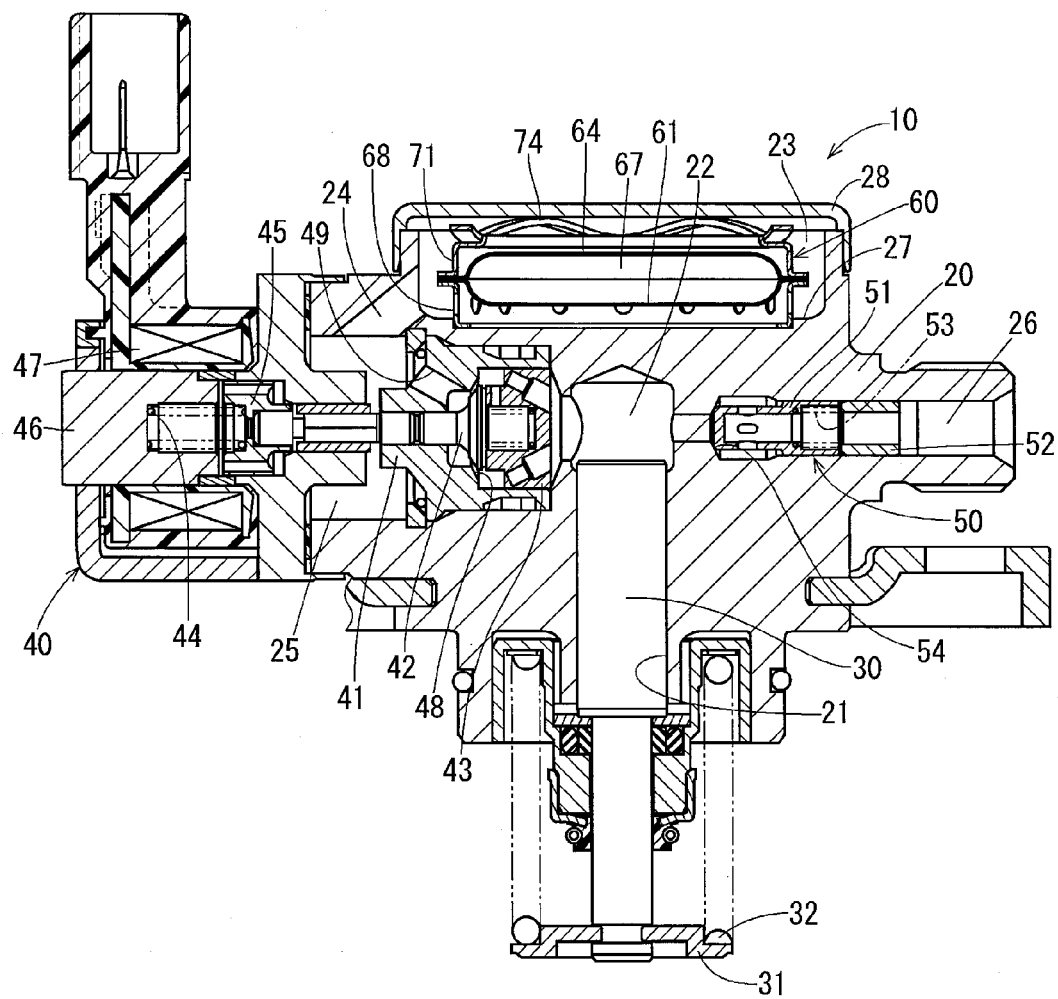
FIG. 1 is a schematic view illustrating a high-pressure pump having a damper device according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A damper device 60 according to a first embodiment is applied to a high pressure pump 10 shown in FIG. 1. The high pressure pump 10 supplies fuel to an injector of an engine, and includes a housing 20, a plunger 30, a suction valve 40, a discharge valve 50, and the damper device 60.

The housing 20 has a solid columnar shape extending in an up-and-down direction in FIG. 1, and has a based fitting hole 21 extending upward from the undersurface of the housing 20. The plunger 30 is fitted to the fitting hole 21. A compressing chamber 22 is defined between the inner surface of the fitting hole 21 and the upper end face of the plunger 30. The volume of the compressing chamber 22 is varied according to the reciprocation of the plunger 30.

The housing 20 has a fuel chamber 23, a first suction passage 24, a second suction passage 25 and a discharge passage 26. The fuel chamber 23 stores fuel supplied from outside. The suction passages 24, 25 connect the fuel chamber 23 to the compressing chamber 22. Fuel is discharged from the compressing chamber 22 to outside via the discharge passage 26.

The fuel chamber 23 may correspond to a fluid passage, and is defined between an inner surface of a concave portion 27 which is defined in the upper part of the housing 20 and an inner surface of a based cylindrical covering 28 fixed to cover the upper part of the housing 20.

The plunger 30 is supported by the inner wall of the fitting hole 21 of the housing 20 to reciprocate in an axial direction. The lower end part of the plunger 30 is projected out of the housing 20, and a spring seat 31 is fixed to the lower end part. A spring 32 is disposed between the spring seat 31 and the housing 20, and biases the plunger 30 downward. The tip end of the plunger 30 may be in contact with a tappet (not shown). When the plunger 30 is pressed to move upward by the tappet, the volume of the compressing chamber 22 is reduced. When the plunger 30 is pressed to move downward by the spring 32 if the pressure by the tappet is eliminated, the volume of the compressing chamber 22 is increased.

The suction valve 40 is a solenoid controlled valve which opens and closes the suction passage 25, and has a suction valve body 41, a suction valve component 42, a stopper 43, a spring 44, a movable core 45, a fixed core 46, and a coil 47.

The suction valve body 41 is fixed in the suction passage 25, and has a seat 48 and a passage 49. The suction valve component 42 may be made of a poppet valve which contacts to or separated from the seat 48. When the suction valve component 42 contacts to the seat 48, the passage 49 and the compressing chamber 22 are disconnected from each other. When the suction valve component 42 is separated from the seat 48 toward the stopper 43, the passage 49 and the compressing chamber 22 communicate with each other.

The movable core 45 is a magnetic object fixed to the end of the suction valve component 42, and is movable integrally with the suction valve component 42. The spring 44 biases the movable core 45 and the suction valve component 42 in a valve opening direction. The coil 47 is a winding wire wound around the fixed core 46, and generates a magnetic field by being energized. The fixed core 46 is arranged at the opposite side from the suction valve component 42 with respect to the movable core 45, and is magnetized by energizing the coil 47.

The movable core 45 is attracted by the fixed core 46 magnetized by energizing the coil 47. When the suction valve component 42 is seated to the seat 48, the suction valve 40 is closed. When the magnetization of the fixed core 46 is canceled, the suction valve component 42 moves to separate from the seat 48 by the energization force of the spring 44, thereby the suction valve 40 is opened. The suction valve 40 is a normally open type valve.

The discharge valve 50 opens and closes the discharge passage 26, and has a discharge valve component 51, a stopper 52, and a spring 53. The discharge valve component 51 contacts to or separates from a seat 54 defined in the housing 20. When the discharge valve component 51 contacts to the seat 54, the discharge passage 26 is closed. The stopper 52 is arranged on the opposite side of the seat 54 with respect to the discharge valve component 51. When the discharge valve component 51 moves in a direction separating from the seat 54, the discharge valve component 51 contacts the stopper 52. The spring 53 biases the discharge valve component 51 in a valve closing direction. The energization force of the spring 53 is set to open the valve 50 if the pressure of fuel in the compressing chamber 22 becomes larger than or equal to a specified value.

The discharge valve 50 is opened when the pressure of fuel in the compressing chamber 22 becomes larger than or equal to the specified value, so the fuel can be discharged out of the compressing chamber 22. When the pressure of fuel in the compressing chamber 22 is less than the specified value, the discharge valve 50 is closed, so the fuel in the compressing chamber 22 is compressed. The discharge valve 50 is a normally close type valve.

Figure 2:
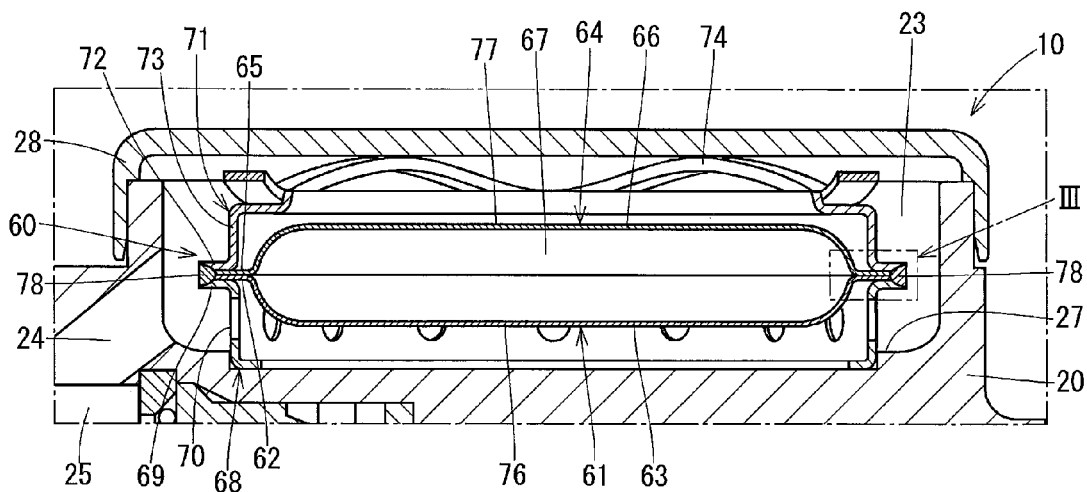
FIG. 2 is an enlarged cross-sectional view illustrating the damper device.

The damper device 60 is disposed in the fuel chamber 23. Next, the damper device 60 will be described in detail. As shown in FIG. 2, the damper device 60 has a first diaphragm 61, a second diaphragm 64, a first support component 68, and a second support component 71.

The first diaphragm 61 is made of a flat board metal, and is constructed by a first center section 63 and a first peripheral part 62. The first diaphragm 61 has a pan shape in which the first center section 63 is recessed downward with respect to the first peripheral part 62. The first center section 63 may correspond to a first damper part.

The second diaphragm 64 is made of a flat board metal, and is constructed by a second center section 66 and a second peripheral part 65. The second diaphragm 64 has a pan shape in which the second center section 66 is recessed upward with respect to the second peripheral part 65. The second center section 66 may correspond to a second damper part.

A damper chamber 67 is defined between the second center section 66 of the second diaphragm 64 and the first center section 63 of the first diaphragm 61. The damper chamber 67 is gas-tight space isolated from the fuel accommodation space of the fuel chamber 23. For example, the damper chamber 67 is filled with inert gas having a predetermined pressure. The first center section 63 and the second center section 66 are elastically deformable according to the pressure of fuel in the fuel chamber 23 so as to increase or decrease the volume of the damper chamber 67.

The first support component 68 is made of metal and has a first support part 69 and a first covering part 70. The first support part 69 has an annular shape arranged on the opposite side from the second peripheral part 65 with respect to the first peripheral part 62. The first covering part 70 has a cylindrical shape extending downward from the radially inner end of the first support part 69 to surround the first center section 63. The first support part 69 may correspond to a first support portion, and is located on an outer side in the radial direction with respect to a pressure receiving surface 76 of the first center section 63.

The second support component 71 is made of metal and has a second support part 72 and a second covering part 73. The second support part 72 has an annular shape arranged on the opposite side from the first peripheral part 62 with respect to the second peripheral part 65. The second covering part 70 has a cylindrical shape extending upward from the radially inner end of the second support part 72 to surround the second center section 66. The second support part 72 may correspond to a second support portion, and the first peripheral part 62 and the second peripheral part 65 are supported between the second support part 72 and the first support part 69. Further, the second support part 72 is located on an outer side in the radial direction with respect to a pressure receiving surface 77 of the second center section 66.

The damper device 60 is fixed by being pressed against the inner wall of the fuel chamber 23 by a wave-shaped washer 74. The first covering part 70 is directly supported by the inner wall of the fuel chamber 23, and the second covering part 73 is indirectly supported through the wave-shaped washer 74 to the inner wall of the fuel chamber 23. The wave-shaped washer 74 may correspond to an elastic member.

Figure 3:
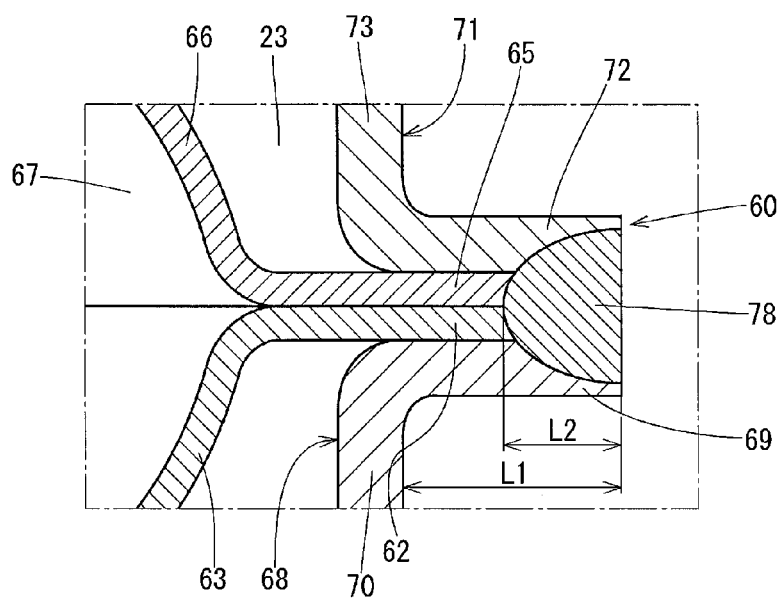
FIG. 3 is an enlarged cross-sectional view illustrating a section III of FIG. 2.

As shown in FIGS. 2 and 3, the first peripheral part 62, the second peripheral part 65, the first support part 69, and the second support part 72 are integrally welded with each other in the radially outer sections to have a weld 78 in common. The welding is performed simultaneously.

As shown in FIG. 3, the thickness of the first support part 69 and the second support part 72 is larger than that of the first peripheral part 62 and the second peripheral part 65, so the rigidity of the first support part 69 and the second support part 72 is higher than that of the first peripheral part 62 and the second peripheral part 65. That is, the first support part 69 and the second support part 72 have the property resisting for a force bending to separate the radially inner ends from each other, and the property of the first support part 69 and the second support part 72 is higher than that of the first peripheral part 62 and the second peripheral part 65.

Moreover, a radial length L1 of the first support part 69 and the second support part 72 is longer than a weld depth L2 of the weld 78 in the first peripheral part 62 and the second peripheral part 65. As a result, the radially inner end of the first support part 69 and the radially inner end of the second support part 72 support the first peripheral part 62 and the second peripheral part 65 on the radially inner side with respect to the weld 78.

The first diaphragm 61 and the second diaphragm 64 are elastically deformable according to the pressure of fuel in the fuel chamber 23 so as to increase or decrease the volume of the damper chamber 67. For example, when the pressure of fuel in the fuel chamber 23 becomes larger than the pressure of the inert gas in the damper chamber 67, the first center section 63 is bent upward and the second center section 66 is bent downward. When the volume of the damper chamber 67 is reduced by the deformation of the first center section 63 and the second center section 66, the volume of the fuel accommodation space of the fuel chamber 23 is increased, thereby restricting the pressure of fuel in the fuel chamber 23 from increasing.

In contrast, when the pressure of fuel in the fuel chamber 23 becomes smaller than the pressure of the inert gas in the damper chamber 67, the first center section 63 is bent downward and the second center section 66 is bent upward. When the volume of the damper chamber 67 is increased by the deformation of the first center section 63 and the second center section 66, the volume of the fuel accommodation space of the fuel chamber 23 is decreased, thereby restricting the pressure of fuel in the fuel chamber 23 from decreasing.

Here, if the first center section 63 and the second center section 66 are deformed to increase the volume of the damper chamber 67, the first peripheral part 62 and the second peripheral part 65 may be deformed in a manner that the radially inner ends of the first peripheral part 62 and the second peripheral part 65 are separated from each other. However, in the present embodiment, the sections of the first peripheral part 62 and the second peripheral part 65 located on the radially inner side with respect to the weld 78 are supported by the first support part 69 and the second support part 72. Therefore, the first peripheral part 62 and the second peripheral part 65 are restricted from being deformed to separate from each other.

According to the damper device 60 of the first embodiment, the first peripheral part 62 of the first diaphragm 61 and the second peripheral part 65 of the second diaphragm 64 are supported between the first support part 69 of the first support component 68 and the second support part 72 of the second support component 71 in the thickness direction. The radially outer sections of the first peripheral part 62, the second peripheral part 65, the first support part 69 and the second support part 72 are welded with each other simultaneously.

Therefore, the first support part 69 and the second support part 72 restrict the first peripheral part 62 and the second peripheral part 65 from being deformed to separate from each other, so the stress caused by the deformation to be acted on the weld 78 can be reduced.

Moreover, the diaphragms 61 and 64 and the support components 68 and 71 are welded simultaneously. Therefore, it is not necessary to mold a resin component after welding, so the production processes can be reduced.

Moreover, in the first embodiment, the radial length L1 of the first support part 69 and the second support part 72 is longer than the weld depth L2 of the weld 78 in the first peripheral part 62 and the second peripheral part 65. Therefore, the radially inner section of the first support part 69 and the radially inner section of the second support part 72 can be supported between the first peripheral part 62 and the second peripheral part 65 on the inner side in the radial direction with respect to the weld 78, so the stress which acts on the weld 78 can be reduced with reliability.

Moreover, in the first embodiment, the first support part 69 and the second support part 72 have thickness and rigidity larger than those of the first peripheral part 62 and the second peripheral part 65. Therefore, even when the radially inner ends of the first peripheral part 62 and the second peripheral part 65 are deformed to separate from each other, the first support part 69 and the second support part 72 have high property to resist the deformation, so the stress which acts on the weld 78 can be reduced with reliability.

Moreover, in the first embodiment, the first support component 68 has the first covering part 70 having the cylindrical shape to surround the first center section 63 of the first diaphragm 61, and the second support component 71 has the second covering part 73 having the cylindrical shape to surround the second center section 66 of the second diaphragm 64. Therefore, the first center section 63 and the second center section 66 can be protected, for example, during transportation of the damper device 60.

Moreover, in the first embodiment, the first covering part 70 of the first support component 68 is directly supported with the inner wall of the fuel chamber 23, and the second covering part 73 of the second support component 71 is indirectly supported through the wave-shaped washer 74 to the inner wall of the fuel chamber 23. Therefore, the damper device 60 can be certainly fixed in the housing 20.

Moreover, in the first embodiment, the damper device 60 is fixed by being pressed against the inner wall of the fuel chamber 23 by the wave-shaped washer 74. Therefore, even if the size of the damper device 60 varies, the damper device 60 is certainly fixed within the housing 20.

Moreover, in the first embodiment, the first support part 69 is located on the outer side in the radial direction with respect to the pressure receiving surface 76 of the first center section 63, and the second support part 72 is located on the outer side in the radial direction with respect to the pressure receiving surface 77 of the second center section 66. Therefore, the weld 78 is enough distanced from the center sections 63 and 66, so the center sections 63 and 66 that are functional parts of the damper device 60 are not affected by heat at the welding time.

(Second Embodiment)

Figure 4:
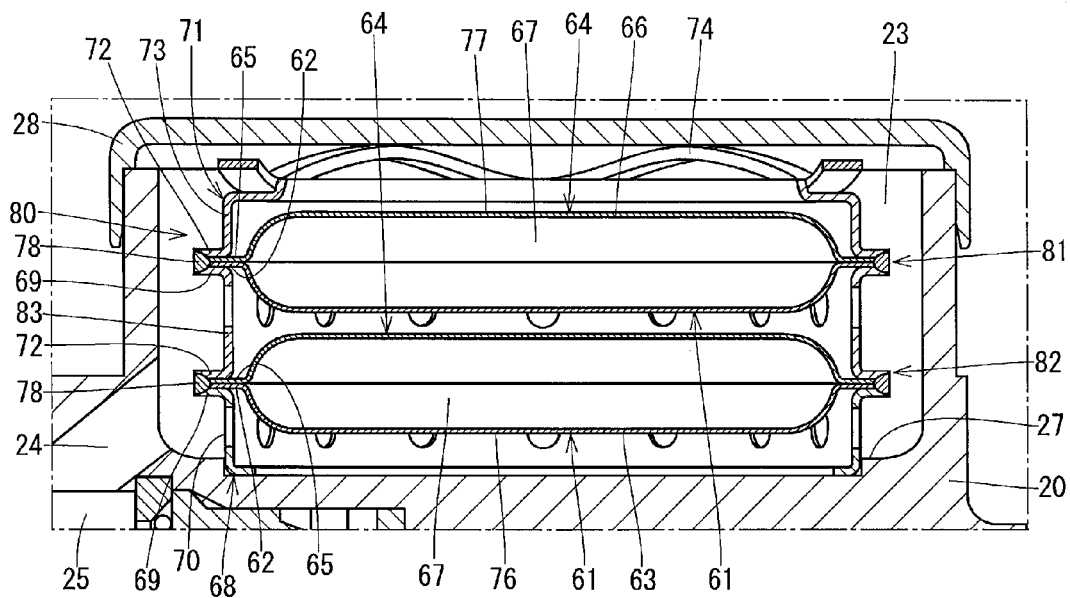
FIG. 4 is an enlarged cross-sectional view illustrating a damper device according to a second embodiment.

A damper device 80 according to a second embodiment is shown in FIG. 4. The damper device 80 has a first damper unit 81 and a second damper unit 82, and a third support component 83 is arranged between the first support component 68 and the second support component 71. The first diaphragm 61 and the second diaphragm 64 of the damper unit 81 are supported between the first support component 68 and the third support component 83, and the first diaphragm 61 and the second diaphragm 64 of the damper unit 82 are supported between the second support component 71 and the third support component 83.

In the second embodiment, similar advantages can be obtained as the first embodiment. Further, the pressure pulsation of fuel in the fuel chamber 23 can be more reduced.

(Third Embodiment)

Figure 5:
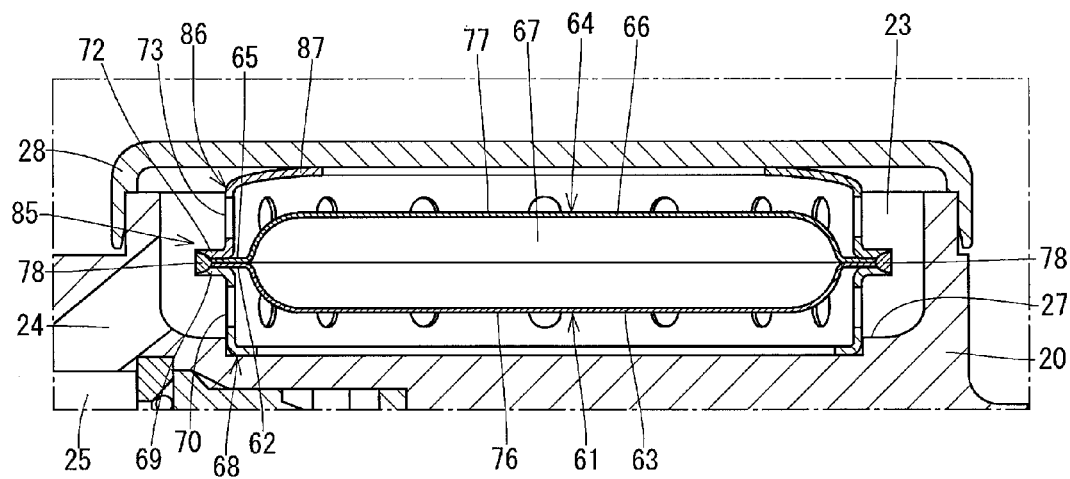
FIG. 5 is an enlarged cross-sectional view illustrating a damper device according to a third embodiment.

A damper device 85 according to a third embodiment is shown in FIG. 5. A second support component 86 of the damper device 85 has an elastic piece 87 extending inward in the radial direction from the upper end of the second covering part 73. The damper device 85 is fixed by being pressed against the inner wall of the fuel chamber 23 by the elastic piece 87. At this time, the first covering part 70 is directly supported with the inner wall of the fuel chamber 23, and the second covering part 73 is indirectly supported through the elastic piece 87 to the inner wall of the fuel chamber 23.

In the third embodiment, similar advantages can be obtained as the first embodiment. Further, the wave-shaped washer 74 can be eliminated.

(Fourth Embodiment)

Figure 6:
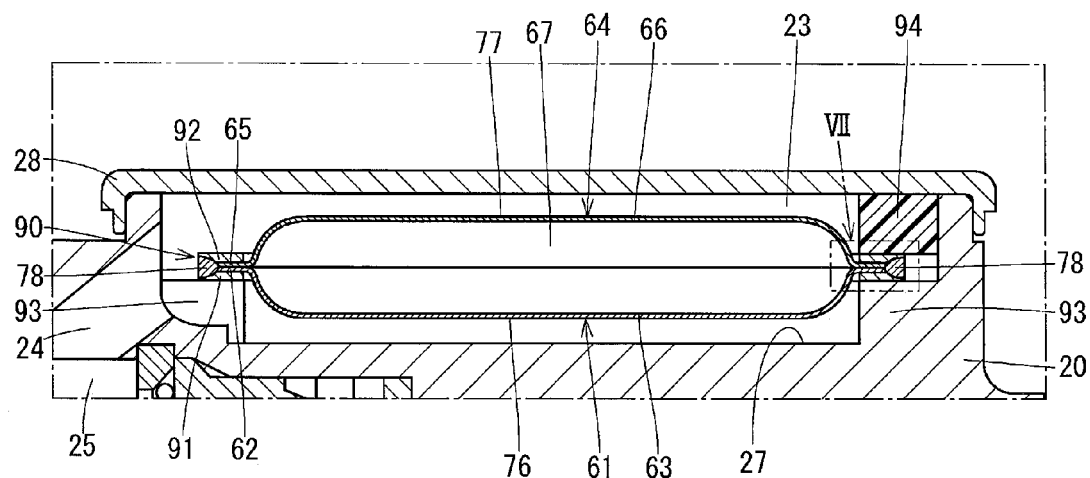
FIG. 6 is an enlarged cross-sectional view illustrating a damper device according to a fourth embodiment.
Figure 7:
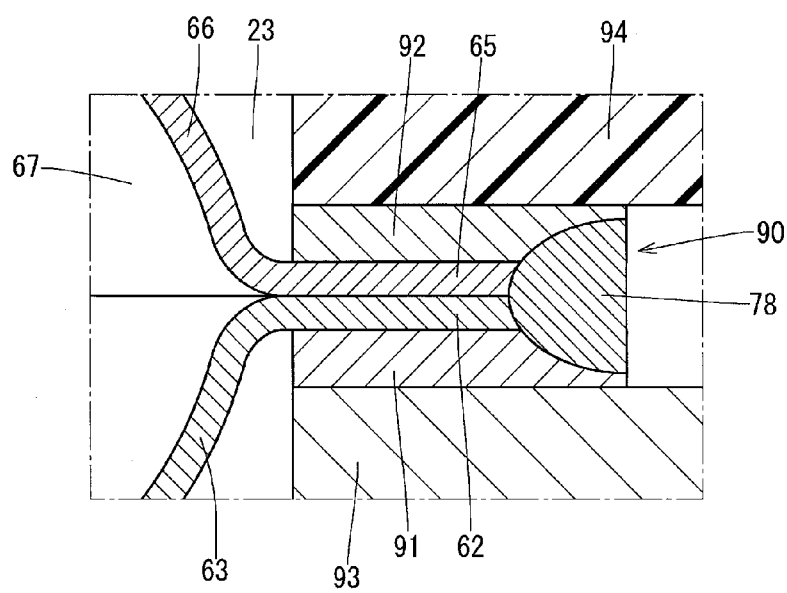
FIG. 7 is an enlarged cross-sectional view illustrating a section VII of FIG. 6.

A damper device 90 according to a fourth embodiment is shown in FIGS. 6 and 7. The damper device 90 includes the first diaphragm 61, the second diaphragm 64, a first support component 91, and a second support component 92, which are simultaneously welded with each other in the radially outer sections. The first support component 91 has approximately the same structure as the first support part 69 of the first embodiment, and the second support component 92 has approximately the same structure as the second support part 72 of the first embodiment. The damper device 90 is fixed between a base 93 of the housing 20 and a retainer 94 at plural positions in the circumference direction.

In the fourth embodiment, similar advantages can be obtained as the first embodiment. Further, the structure of the damper device can be more simplified.

(Fifth Embodiment)

Figure 8:
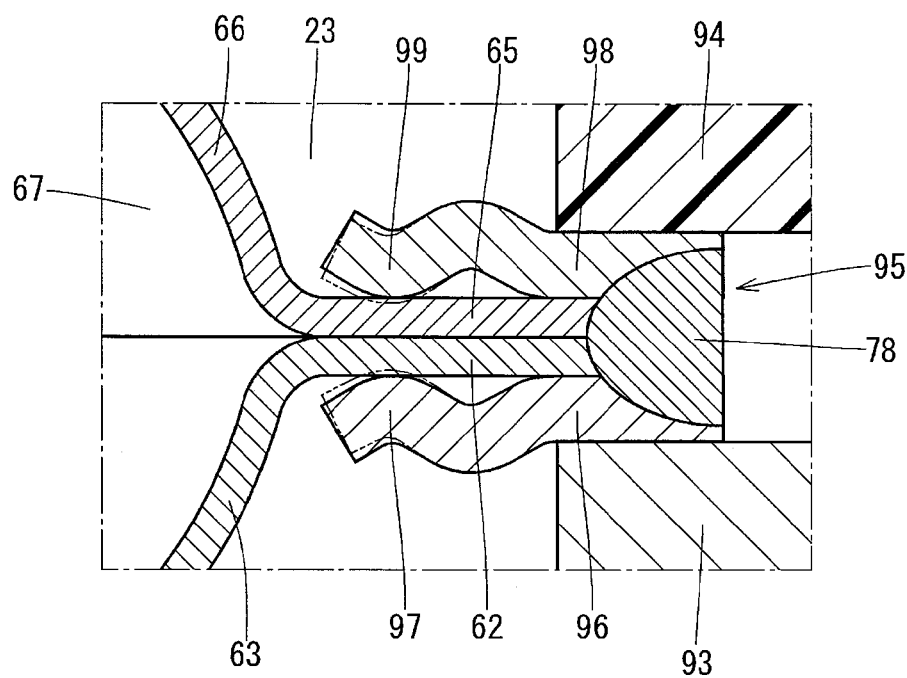
FIG. 8 is an enlarged cross-sectional view illustrating a part of a damper device according to a fifth embodiment.

A damper device 95 according to a fifth embodiment is shown in FIG. 8. The damper device 95 has the first diaphragm 61, the second diaphragm 64, a first support component 96, and a second support component 98, which are simultaneously welded with each other in the radially outer sections. The first support component 96 has an elastic portion 97 on the radially inner section, and a second support component has an elastic portion 99 on the radially inner section.

The first support component 96 has approximately the same structure as the first support part 69 of the first embodiment except the elastic portion 97, and the second support component 98 has approximately the same structure as the second support part 72 of the first embodiment except the elastic portion 99.

In a free state, the elastic portion 97 of the first support component 96 and the elastic portion 99 of the second support component 98 have a state shown in a double chain line of FIG. 8. In this free state, the clearance between the elastic portion 97 and the elastic portion 99 is smaller than the thickness of the combination of the first peripheral part 62 and the second peripheral part 65.

In the welded state indicated by a continuous line of FIG. 8, the elastic portion 97 and the elastic portion 99 pressingly support the first peripheral part 62 and the second peripheral part 65 from the both sides in the thickness direction.

In the fifth embodiment, similar advantages can be obtained as the first embodiment. Further, the structure can be more simplified, and the first peripheral part 62 and the second peripheral part 65 can be restricted from being deformed to separate from each other with more reliability.

(Other Embodiment)

The shape of the first peripheral part, the second peripheral part, the first support part, and the second support part is not restricted to a circle but may be other shape such as ellipse or rectangle, if the shape is annular.

The radially outer surfaces of the first peripheral part, the second peripheral part, the first support part, and the second support part may not agree in the positions in the radial direction.

The rigidity of the first support part and the second support part may be lower than that of the first peripheral part and the second peripheral part.

The second covering part may be directly supported by the inner wall of covering, and the first covering part may be indirectly supported by the inner wall of a housing through a wave-shaped washer or an elastic piece.

The wave-shaped washer may be replaced with other elastic component or support component.

The damper device may be disposed in other passage other than the fuel chamber.

Such changes and modifications are to be understood as being within the scope of the present disclosure as defined by the appended claims.

What is claimed is:

1. A damper device disposed in a fluid passage of a high-pressure pump, the damper device comprising:
   a first diaphragm including a first damper part which is elastically deformable, and a first peripheral part having an annular shape around the first damper part;
   a second diaphragm including a second damper part and a second peripheral part having an annular shape around the second damper part and overlapping with the first peripheral part, a damper chamber being defined between the first damper part and the second damper part, the second damper part being elastically deformable together with the first damper part to increase or decrease a volume of the damper chamber according to a pressure of fluid in the fluid passage;
   a first support portion made of metal and having an annular shape located on an opposite side from the second peripheral part with respect to the first peripheral part;
   a second support portion made of metal and having an annular shape located on an opposite side from the first peripheral part with respect to the second peripheral part, the first peripheral part and the second peripheral part being supported between the first support portion and the second support portion,
   a first covering portion having a cylindrical shape to surround the first damper part and being joined to the first support portion; and
   a second covering portion having cylindrical shape to Surround the second damper part and being joined to the second support portion, wherein:
   radially outer sections of the first peripheral part the second peripheral part the first support portion, and the second support portion are integrally welded with each other to have a weld in common; and
   the first covering portion and the second covering portion are arranged in the fluid passage, and are directly supported by an inner wall of the fluid passage or indirectly supported through a support component.

2. The damper device according to claim 1, wherein
   the first support portion and the second support portion have a radial length defined between a radially outer end and a radially inner end, and
   the radial length is longer than a weld depth of the weld in the first peripheral part and the second peripheral part.

3. The damper device according to claim 1, wherein
   the first support portion and the second support portion have rigidity higher than that of the first peripheral part and the second peripheral part.

4. The damper device according to claim 1, wherein the support component is an elastic piece joined to the first covering portion or the second covering portion.

5. The damper device according to claim 1, wherein
the support component is an elastic member arranged between the inner wall of the fluid passage and the first covering portion or the second covering portion.

6. A damper device disposed in a fluid passage of a high-pressure pump, the damper device comprising:
a first diaphragm including a first damper part which is elastically deformable, and a first peripheral part having an annular shape around the first damper part;
a second diaphragm including a second damper part and a second peripheral part having an annular shape around the second damper part and overlapping with the first peripheral part, a damper chamber being defined between the first damper part and the second damper part, the second damper part being elastically deformable to ether with the first damper part to increase or decrease a volume of the damper chamber according to pressure of fluid in the fluid passage:
a fast support portion made of metal and having an annular shape located on an opposite side from the second peripheral part with respect to the first peripheral part; and
a second support portion made of metal and having an annular shape located on an opposite side from the first peripheral part with respect to the second peripheral part, the first peripheral part and the second peripheral part being supported between the first support portion and the second support portion, wherein:
radially outer sections of the first peripheral part the second peripheral part, the first support portion, and the second support portion are integrally welded with each other to have a weld in common; and
the first support portion and the second support portion are located on an outer side in a radial direction with respect to a pressure receiving surface of the first damper part and a pressure receiving surface of the second damper part.

7. The damper device according to claim 1, wherein
the first diaphragm, the second diaphragm, the first support portion, and the second support portion construct a damper unit, and the damper unit is one of a plurality of damper units.

8. The damper device according to claim 6, wherein
the first diaphragm, the second diaphragm, the first support portion, and the second support portion construct a damper unit, and the damper unit is one of a plurality of damper units.

9. The damper device according to claim 6, wherein
the first support portion and the second support portion have a radial length defined between a radially outer end and a radially inner end, and
the radial length is longer than a weld depth of the weld in the first peripheral part and the second peripheral part.

10. The damper device according to claim 6, wherein
the first support portion and the second support portion have rigidity higher than that of the first peripheral part and the second peripheral part.

* * * * *